(12) United States Patent
Foucault et al.

(10) Patent No.: US 7,519,483 B2
(45) Date of Patent: Apr. 14, 2009

(54) UNSTEADY FLOW METER

(75) Inventors: Eric Foucault, Poitiers (FR); Philippe Szeger, Saint Julien L'Ars (FR); Janick Laumonier, Poitiers (FR); Philippe Micheau, Rock Forest (CA)

(73) Assignees: Center National de la Recherche Scientifique (CNRS), Paris (FR); Universite de Poitiers, Poitiers (FR)

( * ) Notice: Subject to any disclaimer, the term of this patent is extended or adjusted under 35 U.S.C. 154(b) by 0 days.

(21) Appl. No.: 10/589,509

(22) PCT Filed: Feb. 16, 2005

(86) PCT No.: PCT/FR2005/000352
§ 371 (c)(1),
(2), (4) Date: Oct. 13, 2006

(87) PCT Pub. No.: WO2005/080924
PCT Pub. Date: Sep. 1, 2005

(65) Prior Publication Data
US 2007/0192047 A1 Aug. 16, 2007

(30) Foreign Application Priority Data
Feb. 16, 2004 (FR) .................................. 04 01527

(51) Int. Cl.
*G01F 1/34* (2006.01)
(52) U.S. Cl. .................... 702/47; 702/50; 73/861.42
(58) Field of Classification Search ............ 702/45–47, 702/50, 51, 100, 136–138, 140; 73/1.16, 73/1.25, 1.26, 1.35, 170.01, 170.11, 170.14, 73/861, 861.01–861.03, 861.42–861.69; 700/282–285
See application file for complete search history.

(56) References Cited

U.S. PATENT DOCUMENTS

| 3,469,446 | A | | 9/1969 | Kochey et al. |
| 3,967,504 | A | * | 7/1976 | Akeley ........................ 73/722 |
| 4,799,169 | A | | 1/1989 | Mims |
| 5,365,795 | A | * | 11/1994 | Brower, Jr. ................ 73/861.65 |
| 5,493,512 | A | * | 2/1996 | Peube et al. ................... 702/47 |
| 2003/0136196 | A1 | * | 7/2003 | Wiklund et al. ............... 73/716 |

FOREIGN PATENT DOCUMENTS

| DE | 24 59 811 | | 6/1976 |
| DE | 24 59 811 | A1 | 6/1976 |
| EP | 0 496 661 | A1 | 7/1992 |
| EP | 0 496 661 | B1 | 12/1995 |

* cited by examiner

*Primary Examiner*—Manuel L Barbee
(74) *Attorney, Agent, or Firm*—Foley and Lardner LLP (57) ABSTRACT

The invention makes it possible to measure, in real time, the flow of a fluid that is incompressible while having an unsteady flow. The pressure measuring system is primarily comprised of a negative-pressure element (1) placed within the flow and provided with two wall pressure taps (A, B). A means (2) for measuring a pressure difference connected to the pressure taps (A, B) enables the following formula to be solved: $dq(t)/dt + \alpha(q(t)) = \beta \times \Delta p(t)$ directly stemming from fundamental equations of fluid mechanics and/or: $\Delta p(t)$ represents the pressure difference measured by the sensor; $q(t)$ represents the sought volume flow rate, and; $\alpha$ represents a function of the geometry of the negative-pressure element, of the fluid and of the flow $q(t)$, the particularity of this formula being the consideration of the direction of flow in the second term of the left member of the formula.

12 Claims, 4 Drawing Sheets

UNSTEADY FLOW METER

This application is a National Stage application of PCT/FR2005/000352, filed Feb. 16, 2005, which claims priority from French patent application FR 04/01527, filed Feb. 16, 2004. The entire contents of each of the aforementioned applications are incorporated herein by reference.

This present invention concerns the area of measurement of the instantaneous flow of a fluid in unsteady motion.

It finds particular but not limiting advantageous application in the areas of process engineering and the motor-vehicle industry.

More particularly, it finds advantageous application in the control and regulation of internal-combustion engines, test centres and research laboratories, and all the current applications of flow meters from previous art.

More particularly, it finds advantageous application in all the situations where the flow is unsteady, and knowledge of the flow requires the integration of speed in space and time.

GENERAL PRESENTATION OF PREVIOUS ART

Flow measurement is an essential element in the optimisation of industrial processes.

At the present time, in order to ascertain the flow of a fluid in unsteady motion at a given instant, it is generally necessary to employ measurement techniques that enable the speed of this fluid to be determined. Once a set of speeds have been determined for different instants in time, this set of speeds is then integrated spatially in order to ascertain changes to the flow over time.

Many systems and methods have already been proposed as the means to obtain the flow of a fluid in unsteady motion by determining the speed of this fluid.

By way of an example, one can mention the LDV and PIV methods, and the systems which are associated with them.

The PIV method, or Particle Image Velocimetry, is based upon measuring the movement of small particles. Determining the speed of the fluid at a given instant is effected in the following manner. The moving fluid is seeded with particles, and is then illuminated by a laser. The laser emits two pulses offset by a short time interval. A CCD camera synchronised to the laser records an image for each pulse from the laser. The two images obtained are then processed. The movement of the particles between the first and the second image is measured using a correlation technique. By dividing the movement of the particles between the two images by the interval separating the recording of each of these images, one obtains the speed of the moving fluid. This determination of the speed of the fluid is then used to deduce the flow of this fluid.

The LDV method, or Laser Doppler Velocimetry, is based upon the measurement of a Doppler frequency. The moving fluid is seeded with particles and is then illuminated by means of two lasers whose beams cross. The dispersed light coming from the particles passing through the intersection of the two laser beams then produce a Doppler frequency which is proportional to the speed of the particle. Calculation of this speed enables the flow of the moving fluid to be found. Viewing of the flow is achieved in the same manner as in the PIV case.

These methods and systems have the following drawbacks however:

the PIV and LDV methods cannot be used to determine the flow of a fluid in real time. In fact, these techniques require post-processing of the acquired images in order to obtain the speed of the fluid.

The use of such techniques is onerous and expensive.

These methods are also poorly resolved in time, and therefore have a small passband (generally less than 10 Hz for the PIV method).

The fluid has to be seeded with particles.

the fluid and the conduit must be transparent.

Another method used to obtain the flow of a moving unsteady fluid from its speed employs the Pitot tube.

The Pitot tube is an instrument that is used to determine the speed of a moving fluid by measuring a pressure difference. In order to determine the speed of a moving fluid in a conduit, it is necessary to ascertain the direction of the flow. The Pitot tube is inserted into the conduit so that the tube is parallel to the direction of the flow, and so that the front of the Pitot tube is facing into the flow. A first pressure is obtained by taking a first pressure reading at the lateral wall of the Pitot tube. This first measured pressure is a static pressure. A second pressure is obtained by reading the pressure at the front of the tube. This pressure is the total pressure of the fluid. Measuring the difference between these two pressures enables the speed of the moving fluid to be calculated. From the calculation of this speed, it is possible to obtain the flow of the moving fluid.

This method and this system have the following drawbacks however:

the direction of the flow must be known and constant in order to position the Pitot tube.

when the direction of the flow varies, the total pressure measurement is adversely affected, and this causes an error in the acquisition of the speed measurement.

this type of system is intrusive, and therefore disrupts the flow.

A final method, used to ascertain the flow of a fluid in unsteady motion from its speed, is the so-called hot-wire method.

The hot-wire method is based upon heat transfer around a wire heated by an electrical circuit. One places into the moving fluid a wire that is raised by eddy-current effect to a temperature which is greater than the temperature of this fluid. There then occurs an exchange of heat by convection, where the wire is cooled by the moving fluid. It is then possible to determine the speed of the moving fluid by calculating the power that has to be supplied to the wire in order to keep it at a constant temperature. When the speed of the fluid is known, it is then possible to deduce the flow of the fluid in unsteady motion.

This method and this system have the following drawbacks however:

the method is not automated and is insensitive to the direction of fluid flow.

measurements in the liquids, which are conducting most of the time, require that the heated wire (heated by the electrical circuit) should be isolated electrically.

the system has to be calibrated.

the wire ages quite rapidly and this calls for costly maintenance.

the deployment, and in particular the dimensions, of the wire results in serious fragility of the system.

it is an intrusive method, and therefore liable to disrupt the flow.

One objective of this present invention is to provide a method and a system for measuring, in real time, the movement of a fluid in unsteady motion, and which overcomes most of the aforementioned drawbacks.

PRESENTATION OF THE INVENTION

The invention concerns a measurement system for the measurement, in real time, of the instantaneous flow of a fluid in steady or unsteady motion in a conduit, characterised in that it includes:
- a flow-velocity measuring device placed in the conduit, where the said flow-velocity measuring device is equipped with two pressure take-offs in its wall;
- a means of measuring a pressure difference, designed to be connected to the two pressure take-offs;
- a calculation resource designed to calculate the flow in real time by solving an equation that relates the instantaneous flow to the pressure difference, with the latter being positive or negative in the said equation depending on variations in the speed of fluid flow in the conduit and/or the direction of the fluid flow.

As will be explained later, the flow measurement system of this present invention allows the industrial monitoring of even highly pulsed flows, combining low price, simplicity of implementation and reliability. This flow measurement is performed in real time and takes account of the direction of the flow. In addition, the flow measurement system of this present invention is non-intrusive, and does not require calibration.

Preferred, but not limiting, aspects of the flow measurement system according to the invention are as follows:
- the equation includes a term representing the pressure difference, a term representing the instantaneous flow, and a term representing the differential coefficient with time of the instantaneous flow, where each of these three terms can be positive or negative.
- The equation taking account of the direction of the flow is a differential equation of the form:

$$dq(t)/dt + \alpha(q(t)) = \beta \times \Delta p(t),$$

where q(t) is the wanted instantaneous flow, dq(t)/dt is the differential coefficient with time of the wanted instantaneous flow, $\alpha(q(t))$ is a function that depends on the geometry of the system, the fluid and the flow q(t), $\beta$ is a coefficient that depends on the geometry of the device, and $\Delta p(t)$ is the measured instantaneous pressure difference.
- the system also includes a temperature measuring probe.
- the calculation resource is designed to ascertain the density of the fluid by having the temperature measured by the temperature measuring probe, and calculating the instantaneous mass flow of the fluid.
- the system also includes a probe for measuring the absolute static pressure.
- the calculation resource is designed to calculate, in real time, the instantaneous mass flow of a fluid that is compressible in real time, by measuring the absolute static pressure, by measuring the temperature, and by solving the equation relating the instantaneous flow to the pressure difference, where the said equation takes account of the direction of the fluid flow.
- the flow-velocity measuring device is a narrowed tube.
- the flow-velocity measuring device is a diaphragm.
- the flow-velocity measuring device is a venturi.
- the means of measuring the pressure difference is a differential pressure sensor connected to the two pressure take-offs.
- the means of measuring the pressure difference is a set of two relative pressure sensors connected to the two pressure take-offs.
- the calculation resource is an electronic calculator.
- the electronic calculator used to calculate the instantaneous flow in real time, irrespective of the fluctuations in the flow, is an analogue or digital electronic calculator.
- the calculation resource includes a first amplifier connected to a first input of a subtractor, an integrator connected to an output of the subtractor, a feedback loop connected between an output of the integrator and a second input of the subtractor, where the feedback loop includes a module to produce the absolute value function, connected to the output of the integrator, and a multiplier connected by a first input to an output of the module and by a second input to the output of the integrator.

This present invention also concerns a process for measuring the flow of a fluid in steady or unsteady motion in a conduit, characterised in that it includes the following stages:
- the measurement, irrespective of fluctuations in the flow, of a difference between two pressures.
- calculation of the flow of the fluid by solving an equation that relates the flow and the measured pressure difference, where the latter is either positive or negative in the said equation depending on variations in the speed of fluid flow in the conduit and/or the direction of the fluid flow.

Preferred but non limiting aspects of the flow measurement process according to the invention are as follows:
- the second stage of the process consists of calculating the flow of the fluid in unsteady motion by solving a differential equation relating the flow and the measured pressure difference:

$$dq(t)/dt + \alpha(q(t)) = \beta \times \Delta p(t),$$

where q(t) is the wanted instantaneous flow, dq(t)/dt is the differential coefficient with time of the wanted instantaneous flow, $\alpha(q(t))$ is a function that depends on the geometry of the system, the fluid and the instantaneous flow q(t), $\beta$ is a coefficient that depends on the geometry of the device, and $\Delta p(t)$ is the measured instantaneous pressure difference.
- the direction of the flow is included in the term $\alpha(q(t))$ which is dependent on the geometry of the system and the flow q(t).
- the process also includes a stage for acquisition of the fluid temperature.
- the process also includes a stage for acquisition of the absolute static pressure of the fluid.
- the temperature of the fluid and the absolute static pressure of the fluid are included in the equation taking account of the direction of the flow.
- the process allows the calculation, in real time, of the instantaneous flow of a compressible fluid in unsteady motion in a conduit, where the said calculation of flow is achieved by solving an equation that relates the flow to the pressure difference, the absolute static pressure of the fluid and the fluid temperature.

PRESENTATION OF THE FIGURES

Other characteristics, objectives and advantages of this present invention will emerge from the description that follows, which is purely illustrative and non limiting, and which must be read with reference to the appended drawings, in which.

DESCRIPTION OF THE INVENTION

One objective of this present invention is to establish a process and a system allowing measurement of the flow of a fluid in unsteady motion in a conduit, even when the direction of the flow varies over time, and in which flow measurement takes account of the direction of the flow.

To this end, the inventors have established a relation between the instantaneous flow and the pressure of a fluid in unsteady motion in a conduit, which enables a flow to be calculated in real time, and where the value of this flow can be positive or negative, so that the sign of the calculated flow indicates the direction of the fluid flow.

With this in mind, the inventors started with the aerodynamic equations. By firstly applying the usual approximations for flows in a conduit to the equation for total kinetic energy, and then replacing each speed-of-flow term by its expression as a function of the flow in the total kinetic energy equation, the inventors arrived at an equation relating the instantaneous flow and the pressure for a fluid in semi-unidirectional unsteady motion in a conduit.

This equation is a differential equation of the following form:

$$dq(t)/dt + \alpha(q(t)) = \beta \times \Delta p(t),$$

where:
- $q(t)$ represents the wanted flow by volume,
- $dq(t)/dt$ represents the differential coefficient with time of the wanted flow,
- $\alpha(q(t))$ represents a function that depends on the geometry of the system, the fluid and the flow $q(t)$,
- $\beta$ represents a coefficient related to the geometry of the device,
- $\Delta p(t)$ represents the measured pressure difference.

The fact that the equation described above is a differential equation enables one to ascertain the flow by volume in real time, and this could not be done correctly with an algebraic equation.

This differential equation comes directly from the fluid mechanics equations. This equation has the particular feature that it takes account of the direction of the flow. The second term on the left side, $\alpha(q(t))$, is a function of the flow configured by the geometry of the device and by the direction of the flow. This property allows the flow to be measured even when the flow direction reverses.

The presence in the equation of terms whose sign varies according to variations in the speed of fluid flow in the conduit and/or the direction of the flow (term $\Delta p(t)$), and of terms whose sign varies according to the direction of the fluid flow in the conduit (terms $dq(t)/dt$ and $\alpha(q(t))$) enables one to calculate a positive or negative flow, whose sign indicates the direction of the fluid flow.

In particular, in the equation described above, the term $\Delta p(t)$ is employed just as it is, with no absolute value. The sign attributed to the pressure difference, $\Delta p(t)$, varies in particular as a function of the variation of speed of fluid flow and/or according to the direction of the fluid flow. The pressure difference $\Delta p(t)$ is therefore positive or negative, as for example when the fluid flowing in the conduit accelerates or decelerates, and/or when the fluid flows in the conduit in one direction or in the opposite direction.

In addition, in the equation described above, the terms $dq(t)/dt$ and $\alpha(q(t))$ are also used as they are, with no absolute value.

This enables one to calculate a flow whose value can be positive or negative, in contrast to the devices of previous art, which are capable of calculating only positive flows and not negative flows.

The sign of the calculated flow enables account to be taken of the direction of the flow, and the inversions of sign of the calculated flow allow account to be taken of the reversals of direction of the fluid flow.

For example, if the calculated flow, at $t=t_1$, is equal to $(-20\ m^3/s)$, this means that the fluid flows from left to right in the conduit. If the calculated flow at $t=t_2$ is equal to $(+5\ m^3/s)$, then this means that there has been a reversal of the direction of the flow between $t=t_1$ and $t=t_2$, and that the fluid is flowing from right to left in the conduit at $t=t_2$.

The reader will have understood that "absolute value" refers to the square root of the square of a number, where this value can be positive or zero but never negative.

This differential equation has an original form which has the property of always converging on condition that the initial condition is correctly chosen in the order of magnitude of the flow to be found.

Preferably, the initial condition will be chosen at the moment when the flow changes direction, so that $q(t=0)=0$.

Description of One Method of Implementation of the Invention

Figure 1:
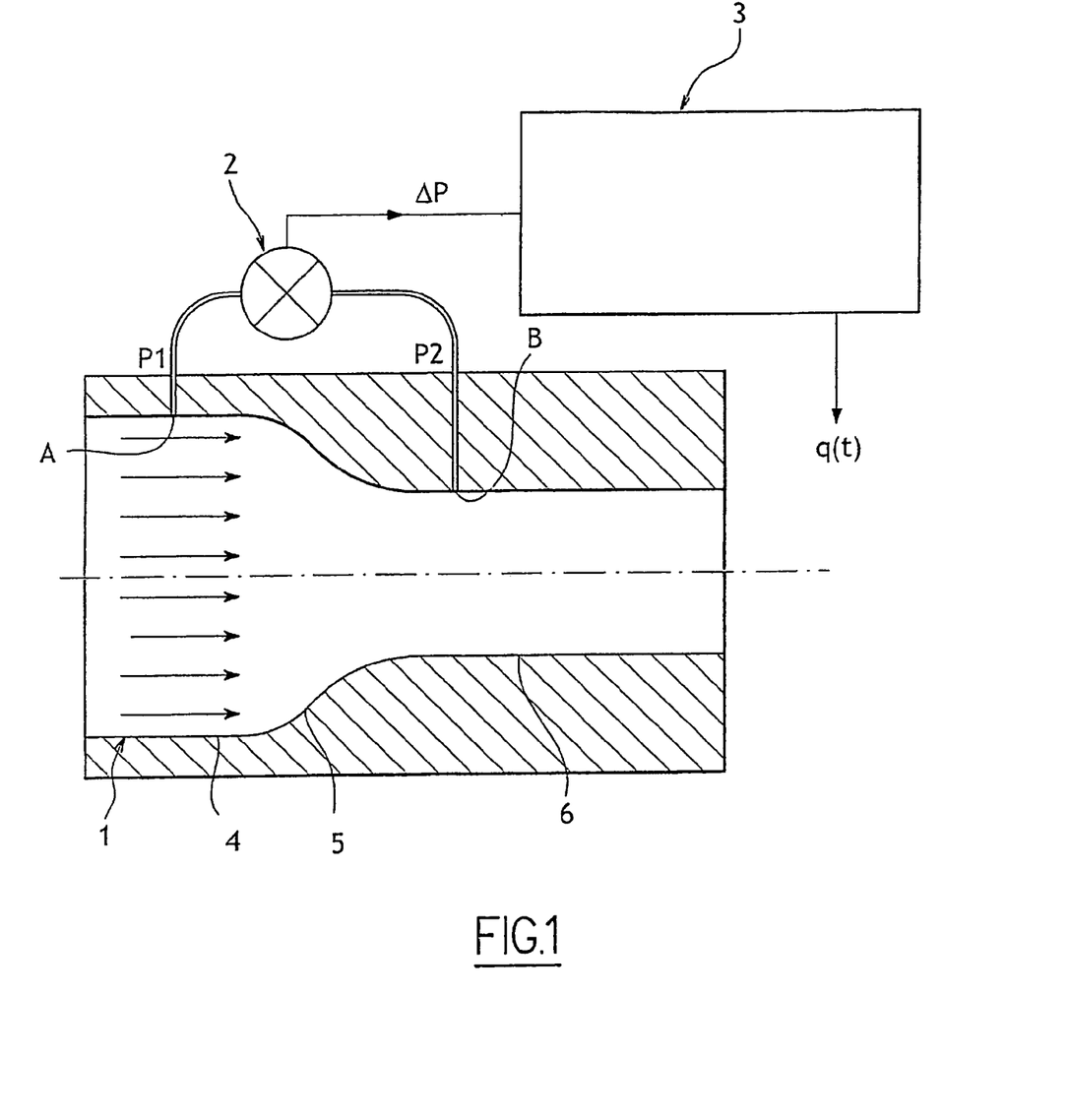
FIG. 1 illustrates a view in section of one method of implementation of this present invention.

As shown in FIG. 1, the inventors have created a system which is designed to measure, in real time, the flow of a fluid in a conduit on the basis of a pressure difference. This system is a flow meter, and is composed mainly of a flow-velocity measuring device 1 inserted into the conduit, a pressure-difference measuring resource 2, and a calculation resource 3 designed to calculate the flow in real time.

The flow-velocity measuring device 1 illustrated in FIG. 1 is a narrowing tube. It is a profiled conduit with a cylindrical first part 4 that has the section S1. This first part 4 ends in a second convergent part 5 which leads to a third cylindrical part 6 of smaller section than S1. Two static pressure take-offs A and B are placed respectively on the wall of the cylindrical first part 4 and on the wall of the third cylindrical part 6 of smaller section.

The pressure-difference measuring resource 2 illustrated in FIG. 1 is a differential pressure sensor. The pressure-difference measuring resource is connected to the two static pressure take-offs A and B of the flow-velocity measuring device 1. The pressure-difference measuring resource 2 enables the difference between the two static pressures to be measured.

Figure 2:
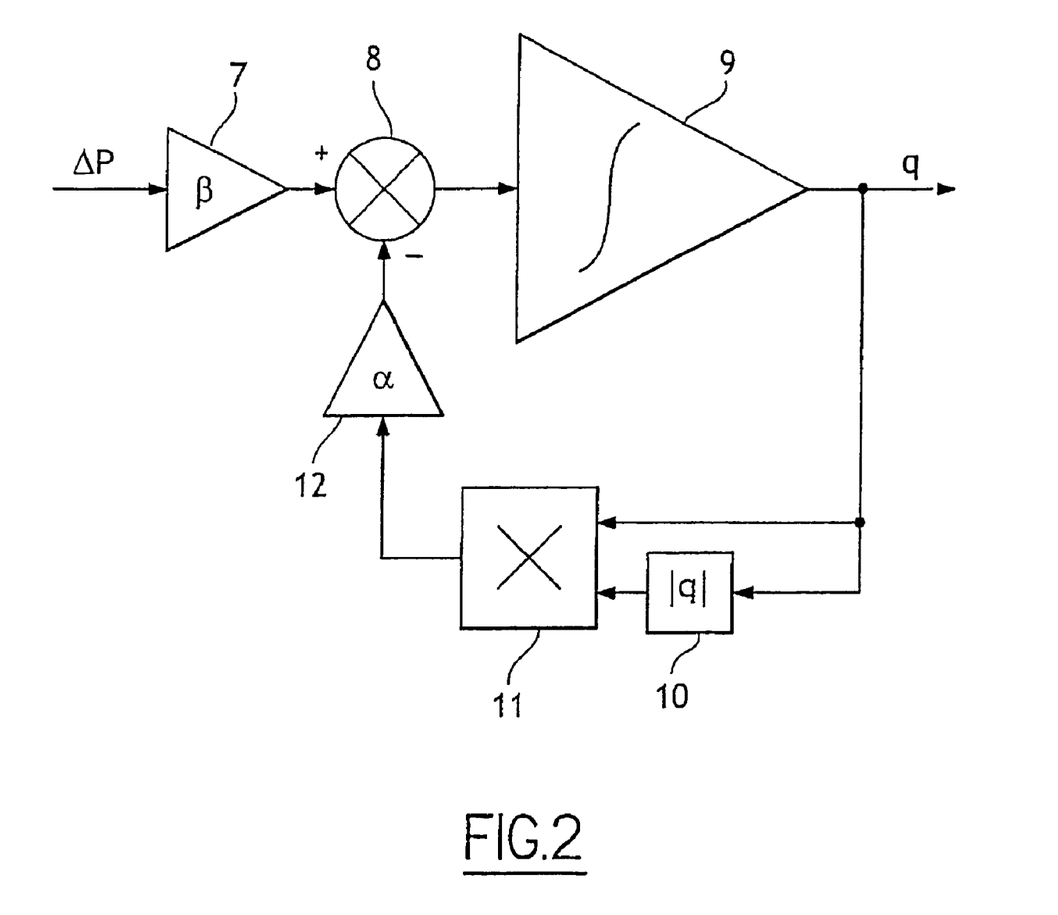
FIG. 2 illustrates a block diagram to be implemented in order to determine the flow of a fluid according to the process of this present invention.
Figure 3:
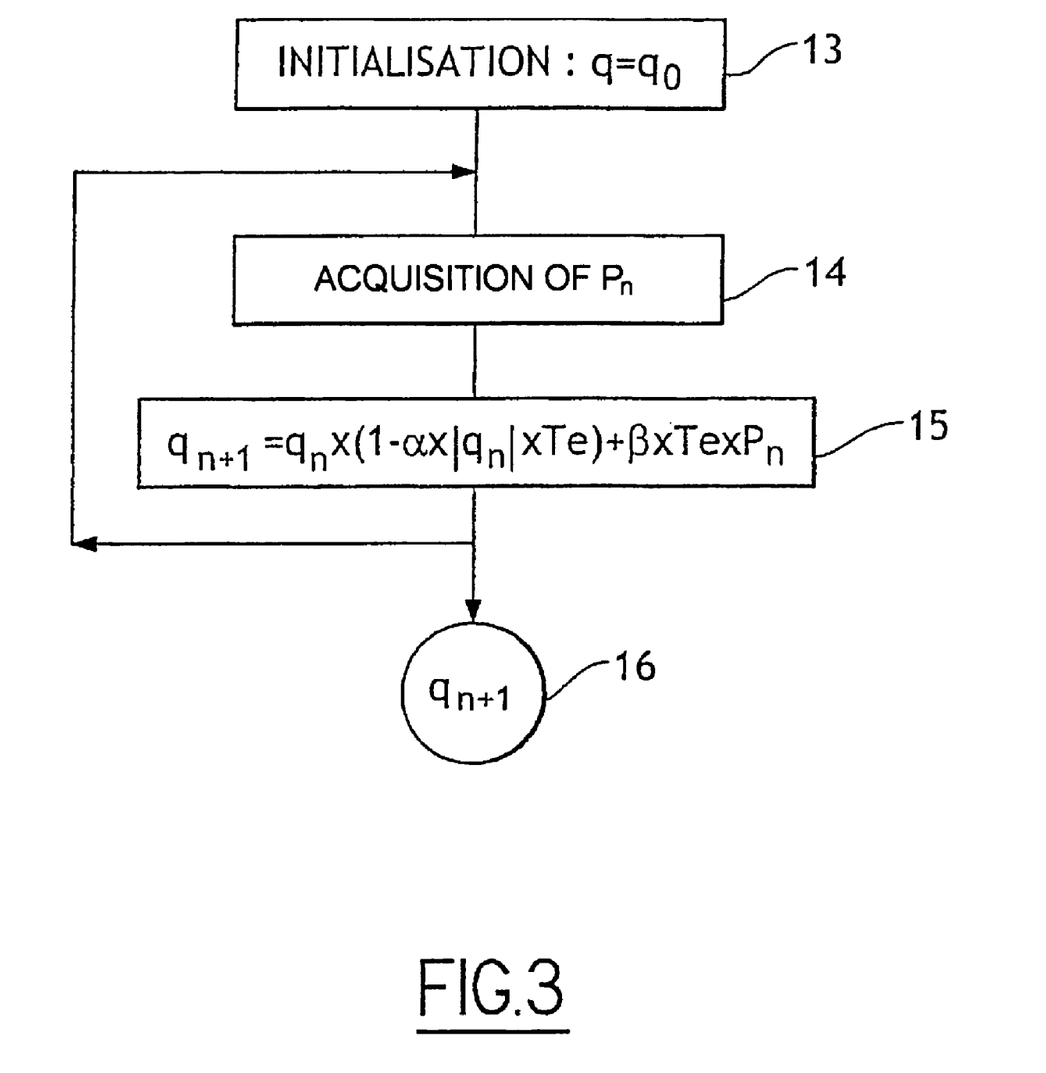
FIG. 3 illustrates an example of a numerical algorithm to be executed in order to determine the flow of a fluid according to the process of this present invention.

The calculation resource 3 is an electronic calculator. This calculation resource 3 is programmed to execute the algorithm for solving the equation to calculate the flow, and the sign of this flow takes account of the direction of the flow. The calculation resource is designed to calculate the flow in real time by solving an equation relating the instantaneous flow to the pressure difference, this pressure difference being positive or negative in the said equation, depending on variations in the speed of fluid flow in the conduit and/or the direction of the fluid flow. The equation relating the instantaneous flow to the pressure difference has the advantage of allowing the calculation resource to calculate a flow regardless of the direction of the current, to detect the direction of fluid flow, and to detect changes in the direction of the fluid flow. This calculation resource can be digital or analogue, as illustrated in FIGS. 2 and 3.

The principle of operation of the measuring system of FIG. 1 is as follows:

The fluid flows in a conduit and passes through the flow-velocity measuring device 1.

The pressure-difference measuring resource 2 measures the difference between the static pressure P1 acquired at pressure take-off A, and the static pressure P2 acquired at pressure take-off B. The pressure difference measured by the measuring resource 2 is transmitted in the form of an electrical signal to the input of the calculation resource 3.

The calculation resource 3 calculates the flow of the fluid in real time from the pressure difference received as input. In fact, the calculation resource 3 is designed to solve the equation relating the flow to the pressure difference, where this equation allows calculation of the flow in real time and also gives the direction of the fluid flow.

At the output of the calculation resource 3, one obtains the flow of the fluid in unsteady motion.

The device of FIG. 1 therefore allows the measurement in real time of the flow of a fluid in a conduit. Measurement of this flow requires only two measurements of static pressure, and this is achieved by a single differential pressure sensor. Creating the device of this present invention is therefore simplified, and the presence of a single differential pressure sensor in the device results in a reduced cost of the said device.

In addition, in contrast to the systems of the previous art, the device of this present invention allows reversals of direction of the flow, and takes account of the direction of the flow.

In addition, the device of FIG. 1 does not require flow calibration, and the presence of only two pressure take-offs in the wall does not disrupt the flow, in contrast to a measurement system by hot wire or Pitot tube for example, where the probe is inserted directly into the conduit.

The block diagram of FIG. 2 illustrates in principle the integration of the differential equation used to calculate the flow, and taking account of the direction of the flow, by means of a closed-loop circuit. This diagram comprises an integrator closed by a negative feedback loop which provides asymptotic stability of the integral form of the differential equation, that is of the equation to calculate the flow in real time and giving the direction of the flow.

The calculation resource 3 can be analogue. As illustrated in FIG. 2, the calculation resource is composed of a first amplifier 7, which can be purely passive, a subtractor 8, an integrator 9, and a feedback loop that includes a circuit 10 (or module) producing the absolute value function, a multiplier 11 with two inputs, and a second amplifier 12. The feedback loop enables transmission to the input of the subtractor 8 of a value that is a function of the calculated flow obtained at the output of the calculation resource (that is at the output of the integrator 9.

The input to the first amplifier 7 is the input to the calculation resource. The first amplifier 7 amplifies the input signal of the calculation resource by coefficient $\beta$. This coefficient is the value of the coefficient $\beta$ of the differential equation. This coefficient is a function of the geometry of the device, and more particularly of the geometry of the flow-velocity measuring device. The value of this coefficient is determined once only. This process can be effected in different ways, such as:
  by comparative calibration for example,
  by directly evaluating the flow of a real or simulated fluid, constant or periodic, of period T (in the simulated case, this requires knowledge of the pressure calibration of the differential sensor),
  by calculation.

The first amplifier 7 receives as input the input signal from the calculation resource. This input signal from the calculation resource is a signal representing the pressure difference. It is taken from the pressure-difference measuring resource 2. The output of this first amplifier 7 goes to the subtractor 8.

The subtractor 8 is used to obtain the difference between the output signal from the first amplifier 7 and the signal obtained from the feedback loop. This signal obtained from the feedback loop corresponds to the term $\alpha(q(t))$ of the differential equation (here we have $\alpha(q(t))=\alpha \times q(t) \times |q(t)|$).

The output from the subtractor 8 is used as input to the integrator 9. This integrator 9 is then use to integrate the output signal from the subtractor 8 in real time. The output signal from the subtractor 8 corresponds to the differential coefficient with time of the wanted flow (In fact from the equation we have $dq(t)/dt=\beta \times \Delta p(t) - \alpha(q(t))$). The signal appearing at the output of the integrator 9 corresponds to the wanted flow (q). This is the output from the calculation resource.

The signal appearing at the output of the integrator 9 is sent to the input of the multiplier 11. It is also sent to the input of the circuit 10 producing the absolute value function. The output from the circuit 10 producing the absolute value function is used as the second input to the multiplier 11.

The multiplier 11 effects the multiplication of the output signal from the integrator 9 by the output signal from the circuit 10 producing the absolute value function. The output of the multiplier 11 is then used as input to the second amplifier 12.

The second amplifier 12, which can be purely passive, amplifies the output signal by a coefficient $\alpha$. This coefficient is a function of the geometry of the device and more particularly of the geometry of the fluid velocity measuring device 1. It is also a function of the characteristics of the fluid. The value of this coefficient is determined once only. This determination can be effected in different ways, such as, for example:
  by comparative calibration,
  by directly evaluating the flow in a real or simulated periodic flow of period T (in the simulated case, this requires knowledge of the pressure calibration of the differential sensor),
  by calculation.

In practice, determination of parameters $\alpha$ and $\beta$ in operation requires adjustments which are interdependent.

The principle of operation of the calculation resource of FIG. 2 is as follows:

As indicated previously, the differential equation relating the flow of a fluid in unsteady motion to a pressure difference is of an original form which has the property of always converging on condition that the initial condition is correctly chosen, of the order of magnitude of the mean flow (e.g. $q(t=0)=0$ when the flow changes direction). This means that given an initial condition on the output signal from the integrator, this output signal will converge to a value representing the wanted flow.

To begin with, there will be a zero signal, for example, at the output of the integrator ($q(t=0)=0$). The calculation resource receives as input a signal representing the pressure difference between the two pressure take-offs. This signal is amplified by the first amplifier 7. The output signal from this first amplifier corresponds to the term $\beta \times \Delta p(t)$ of the differential equation.

The output signal from the first amplifier 7 is transmitted to the first input of the subtractor 8. The signal obtained from the feedback loop arrives at the second input of the subtractor 8 (equal to zero to begin with, since the initial condition chosen is $q(t=0)=0$). The subtractor 8 effects the subtraction of these two signals. The output signal from the subtractor correspond to the term dq/dt in the differential equation.

The output signal from the subtractor 8 is sent to the integrator 9. This signal is integrated by the integrator 9 which delivers as output a signal representing the wanted flow (q).

The output signal from the integrator 9 is sent to the output of the calculation resource and as input to the feedback loop. The input signal to the feedback loop is sent to one of the inputs of the multiplier 11, and also to the input of the circuit 10 producing the absolute value function. The output signal from the integrator 9 and the output signal from the circuit 10 producing the absolute value are multiplied by the multiplier 11.

The output of the multiplier 11 is then sent to the second amplifier 12 which amplifies it. The output of the second amplifier 12 corresponds to the term $\alpha(q(t))$ of the differential equation.

The output signal from the second amplifier is sent to the second input of the subtractor. This signal takes account of the direction of the flow.

The subtractor effects the subtraction of the output signal from the first amplifier and the output signal from the second amplifier. The output of the subtractor is integrated by the integrator, which delivers as output a signal representing the flow q(t). Over time, the output signal from the integrator, which corresponds to the output signal from the calculation resource, converges to a value corresponding to the instantaneous solution of the differential equation.

The analogue calculation resource of FIG. 2 can therefore be used to calculate the instantaneous flow and to give the direction of flow of a fluid in unsteady motion.

As illustrated in FIG. 3, the electronic calculation resource can also be digital. FIG. 3 shows an example of a numerical algorithm, programmed in the digital calculation resources, designed for the use of a measurement system that includes a fluid-velocity measuring device of the narrowing-tube type. The algorithm, which relates to the process of determining instantaneous flow from the pressure difference, has 3 stages. The calculation resources include resources that are designed to execute these stages.

A signal is acquired representing the pressure difference, every Te seconds.

The first stage 13 consists of determining the initial condition allowing the differential equation to be solved. Preferably the initial condition chosen will be $q_0=q(t=0)=0$ when the flow changes direction.

In the second stage 14, a pressure difference $P_n$ is acquired.

In a third stage 15, the value $q_{n+1}$ is calculated, corresponding to the wanted flow, by discretising the differential equation relating the instantaneous flow to the pressure difference, such as by means of the equation $$q_{n+1}=q_n \times (1-\alpha \times |q_n| \times Te) + \beta \times P_n \times T_e$$

At the output of the third stage 15 this gives the value $q_{n+1}$ calculated from $q_n$ and Pn.

By thus reiterating stages 14 and 15, then from the differential pressure signal P sampled in accordance with time base $T_e$, the output q of the digital calculation resource supplies a series of discrete values $q_0, q_1, \ldots q_n$ which converge to the instantaneous solution of the differential equation.

Figure 4A:
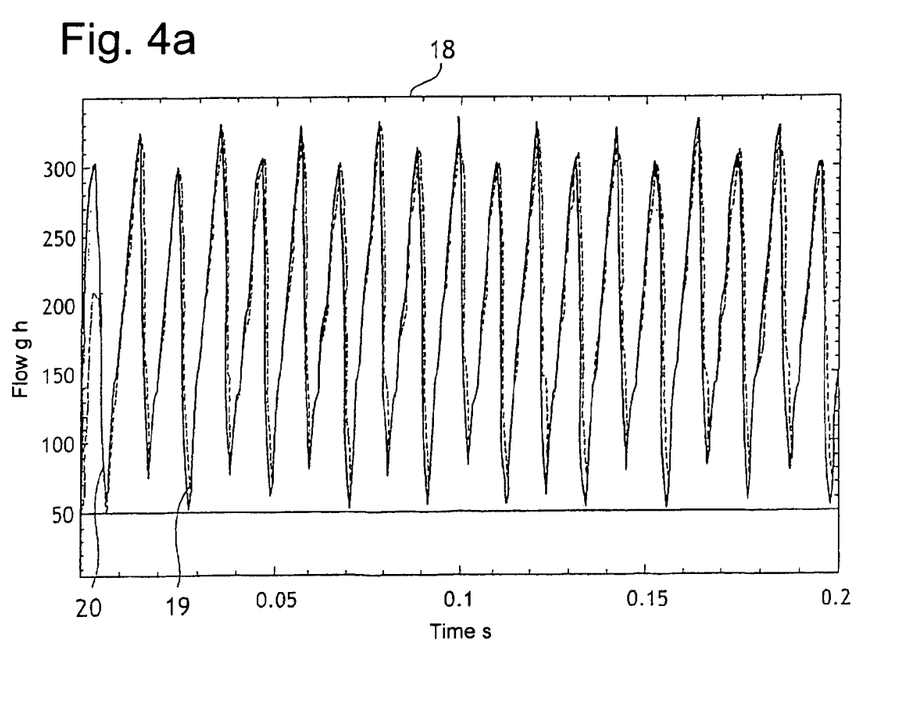
FIGS. 4a and 4b illustrate a comparison between flow measurement by the process of this present invention and flow measurement by the hot-wire method.
Figure 4B:
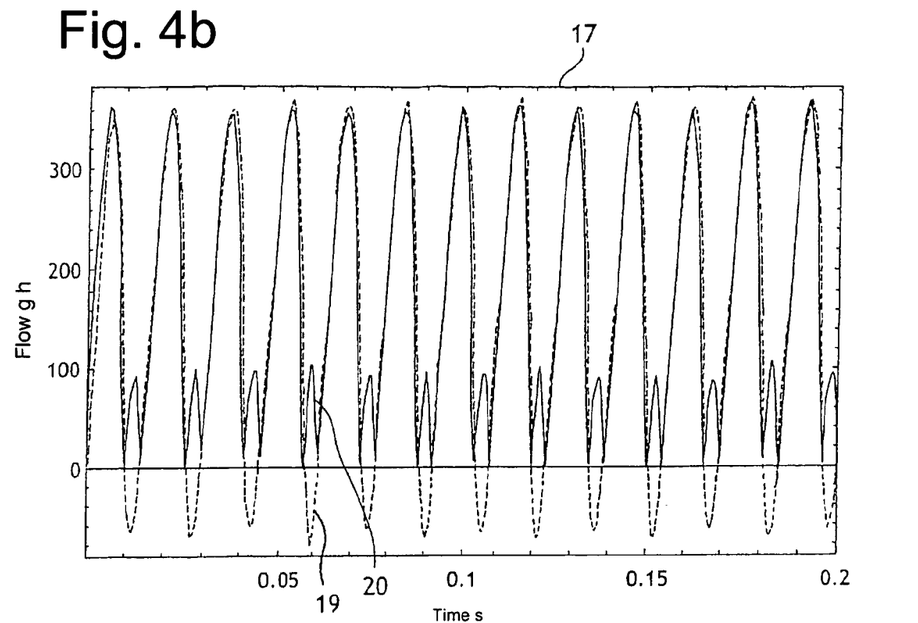

FIG. 4 shows an example of results obtained using the device of FIG. 1. The evolution of a pulsed flow in a conduit is measured by the invention, and compared to the flow reconstituted from the speed of the fluid determined by a hot wire placed at the centre of the conduit.

The first graph 17 and the second graph 18 of FIG. 4 show changes in the flow in a conduit over time. The dashed lines show the results obtained with the device of this present invention. The solid lines show the results obtained with the hot-wire measuring device.

On the first graph 17, it can be seen that the hot-wire measuring device, which is incapable by design of giving the direction of the flow, always gives a positive flow, even when the latter reverses. This is not the case for the system of this present invention, which is perfectly suited to reversals in the direction of flow. This is due to the fact that the measuring system of this present invention takes account of the direction of the flow.

On the second graph 18, it can be seen that the device of this present invention has a very good resolution in time (broad passband) since the pulse rate achieved in the second graph of FIG. 4 is close to 90 Hz.

The pressure measuring system of this present invention therefore allows measurement of the flow of a fluid in unsteady motion in a conduit. It requires only two static pressure take-offs, and can tolerate any fluctuation of the flow, including reversals of direction. This is rendered possible by solving the equation relating the flow to the pressure difference and used to calculate the flow in real time, and also gives the direction of the flow.

The reader will have understood that many variants of this present invention are possible.

For example, the flow-velocity measuring device 1 could be a venturi, a diaphragm, or any device that introduces a pressure drop into the flow.

In addition, the calculation resource could be of a type other than those illustrated in FIGS. 2 and 3, the particular feature of this calculation resource being that it is designed to solve an equation relating the flow to the pressure difference, where the said equation is used to calculate the flow of the fluid, and takes account of the direction of the fluid flow.

Apart from this, improvements can be made to the system and to the process of this present invention.

Flow measurement here has been measured in terms of the volume q(t) of an incompressible fluid in unsteady motion in a conduit. However, it is possible to calculate the mass flow $q_m$, by finding the product of the flow measurement and the density $\rho$ of the fluid. This density is mainly a function of the temperature of the fluid and the absolute static pressure.

So by adding a temperature measuring probe to the device of FIG. 1, and using the function $\rho(T)$ giving the density of the fluid according to the temperature in the calculation resources, it is possible to calculate the mass flow from the flow by volume measurement, with the expression:

$$q_m(t) \rho(T) \times q(t)$$

The introduction into the calculation resource of resources designed to ascertain the density $\rho(T)$ of the fluid from the temperature measurement obtained by means of the temperature measuring probe, and resources designed to find the product of the flow by volume q(t) and the density $\rho(T)$, it is possible to calculate the mass flow of an incompressible fluid in unsteady motion in a conduit.

In addition, measuring the absolute static pressure as well as the temperature enables account to be taken of the effects of compressibility of the fluid, and thus to extend the applications of this present invention to compressible flows (this absolute static pressure measurement can also be taken into account when acquiring the density ρ of an incompressible fluid so that the mass flow calculation is more accurate).

Therefore by adding a temperature measuring probe and a probe for measuring absolute static pressure to the device of FIG. 1, and by adapting the calculation resource to that it received as input the pressure difference measured by the pressure-difference measuring resource 2, the temperature measurement acquired by the temperature measuring probe and the static pressure measurement acquired by the static pressure measuring probe, it is possible to calculate the mass flow of a compressible fluid in unsteady motion in a conduit from the equation relating the flow to a pressure difference, where the said equation takes account of the direction of the fluid flow.

In addition, the pressure-difference measuring resource can be other than a differential pressure sensor. For example, the two pressure take-offs can be connected to two relative pressure measuring probes, so that the relative static pressures P1 and P2 can then be obtained at the output of the probes. The difference between these two relative static pressures P1 and P2 can then be obtained either by means of an electronic unit designed to find the difference between the two relative static pressures measured, and located between the two measuring probes and the calculation resource, or by means of the calculation resource 3 if the latter has the resources to ascertain this difference. Each of the first and second pressure take-offs can also be composed of a multiplicity of elementary pressure take-offs that are connected together and distributed around the periphery of the conduit.

In this case, the first pressure take-off includes several elementary pressure take-offs located in a first plane perpendicular to the axis of the conduit. The pressure measured by means of the first pressure take-off is then equal to the mean of the pressures measured by the elementary pressure take-offs of the first pressure take-off. Likewise, the second pressure take-off includes several elementary pressure take-offs located in a second plane perpendicular to the axis of the conduit, where the first and second planes are separate. The pressure measured by means of the second pressure take-off is then equal to the mean of the pressures measured by the elementary pressure take-offs of the second pressure take-off.

The invention claimed is:

1. A system for the measurement, in real time, of the instantaneous flow of a fluid in steady or unsteady motion in a conduit, comprising:
    a flow-velocity measuring device placed in the conduit, where the said flow-velocity measuring device is equipped with two pressure take-offs in the wall,
    a pressure-difference measuring device designed to be connected to two pressure take-off,
    a calculation resource designed to calculate flow, in real time, by solving an equation that relates the instantaneous flow to the pressure difference, where the latter is positive or negative in the said equation depending on variations in the speed of fluid flow in the conduit and/or the direction of the fluid flow,
    wherein the calculation resource is an analogue or digital electronic calculator, and
    wherein the calculation resource includes a first amplifier connected to a first input of a subtractor, an integrator connected to an output of the subtractor, a feedback loop connected between an output of the integrator and a second input of the subtractor, where the feedback loop includes a module producing the absolute value function connected to the output of the integrator, and a multiplier which is connected by a first input to an output of the module and by a second input to the output of the integrator.

2. A system according to claim 1, wherein the equation includes a term representing the instantaneous flow, and a term representing the differential coefficient with time of the instantaneous flow, where each of these two terms can be positive or negative.

3. A system according to 1, wherein the equation taking account of the direction of the flow is a differential equation of the form:

$$dq(t)/dt + \alpha(q(t)) = \beta \times \Delta p(t),$$

where
    $q(t)$ represents the wanted instantaneous flow,
    $dq(t)/dt$ represents the differential coefficient with time of the wanted instantaneous flow,
    $\alpha(q(t))$ represents a function that depends on the geometry of the system, of the fluid and of the flow $q(t)$,
    $\beta$ represents a coefficient that depends on the geometry of the device,
    $\Delta p(t)$ represents the measured instantaneous pressure difference.

4. A system according to claim 3, wherein the system also includes a probe for measuring absolute static pressure.

5. A system according to claim 1, wherein the system also includes a temperature measuring probe.

6. A system according to claim 5, wherein the calculation resource is designed to ascertain the density of the fluid by having the temperature measured by the temperature measuring probe and calculating the instantaneous mass flow of the fluid.

7. A system according to claim 6, wherein the calculation resource is designed to calculate, in real time, the instantaneous mass flow of a fluid that is compressible in real time, by means of an absolute static pressure measurement and a temperature measurement, and by solving the equation relating the instantaneous flow to the pressure difference, where the said equation takes account of the direction of the fluid flow.

8. A system according to claim 1, wherein the flow-velocity measuring device is a narrowing tube.

9. A system according to claim 1, wherein the flow-velocity measuring device is a diaphragm.

10. A system according to claim 1, wherein the flow-velocity measuring device is a venturi.

11. A system according to claim 1, wherein the pressure difference measuring device is a differential pressure sensor connected to the two pressure take-offs.

12. A system according to claim 1, wherein the means of measuring a pressure difference is a set of two relative pressure sensors connected to the two pressure take-offs.

* * * * *